(12) United States Patent
Chatard et al.

(10) Patent No.: US 6,796,780 B1
(45) Date of Patent: Sep. 28, 2004

(54) DEVICE FOR THE PRODUCTION OF PLASTIC CONTAINERS BY STRETCH BLOW FORMING USING AN EXPLOSIVE BLOWING MEDIUM

(75) Inventors: Dominique Chatard, Heidelberg (DE); Jens Fuchs, Uelversheim (DE); Hans Kindinger, Wilmshausen (DE); Rolf Kuhn, Ingelheim (DE); Thomas Riedel, Biebesheim (DE); Eberhard Sendobry, Rimbach (DE); Rudiger Wlach, Buttelborn (DE); Lothar Wilhelm, Karben (DE)

(73) Assignee: Tetra Laval Holdings & Finance S.A. (CH)

( * ) Notice: Subject to any disclaimer, the term of this patent is extended or adjusted under 35 U.S.C. 154(b) by 134 days.

(21) Appl. No.: 10/049,559
(22) PCT Filed: Jul. 12, 2000
(86) PCT No.: PCT/EP00/06604

§ 371 (c)(1),
(2), (4) Date: Jun. 4, 2002

(87) PCT Pub. No.: WO01/12416

PCT Pub. Date: Feb. 22, 2001

(30) Foreign Application Priority Data

Aug. 16, 1999 (DE) .......................................... 199 38 724

(51) Int. Cl.⁷ .......................... B29C 49/12; B29C 49/46
(52) U.S. Cl. ............................. 425/1; 264/84; 425/529; 425/535
(58) Field of Search ............................ 425/1, 529, 535; 264/84

(56) References Cited

U.S. PATENT DOCUMENTS

| 3,252,312 A | * | 5/1966 | Maier ............................. 72/56 |
| 3,908,419 A | * | 9/1975 | Brownbill ....................... 72/56 |
| 4,214,860 A | * | 7/1980 | Kleimenhagen et al. ..... 425/529 |
| 4,457,352 A | * | 7/1984 | Scheffer ......................... 164/5 |
| 4,473,515 A | * | 9/1984 | Ryder .......................... 425/529 |
| 5,895,666 A | * | 4/1999 | Brilman .......................... 425/1 |
| 6,315,939 B1 | * | 11/2001 | Mock et al. .................... 425/1 |

FOREIGN PATENT DOCUMENTS

| DE | 2742693 | 4/1979 | |
| DE | 69607636 T2 | 11/2000 | |
| JP | 56027330 A | * 3/1981 | ........... B29D/23/03 |
| WO | WO 9713632 A1 | * 4/1997 | ........... B29C/49/42 |
| WO | WO 9806559 A1 | * 2/1998 | ........... B29C/49/46 |
| WO | WO 0253351 A1 | * 7/2002 | ........... B29C/49/46 |

* cited by examiner

Primary Examiner—Robert B. Davis
(74) Attorney, Agent, or Firm—Michael L. Dunn

(57) ABSTRACT

A device for manufacturing containers from a plastic material which can be formed by stretch-blowing with a mold, the internal space of which corresponds to the finished container, which is held by its open end by a receiving portion, wherein lines connected to a metering unit are provided on the receiving portion, a moveable stretching die is guided axially through the receiving portion, and an ignitor is arranged for igniting an explosive gas mixture inside the container, and wherein a heater and cooler are provided.

15 Claims, 14 Drawing Sheets

Figure 1:
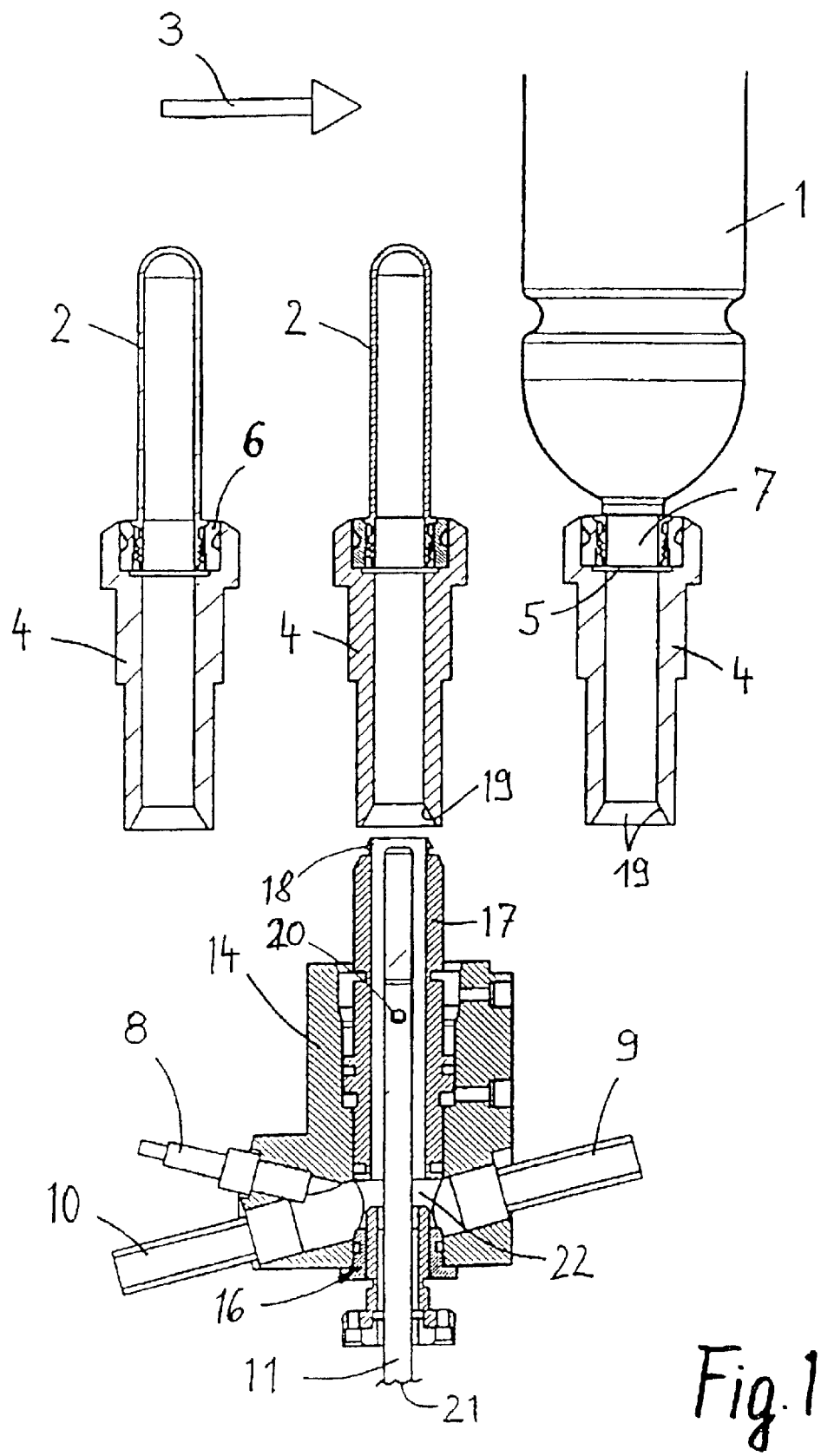

DEVICE FOR THE PRODUCTION OF PLASTIC CONTAINERS BY STRETCH BLOW FORMING USING AN EXPLOSIVE BLOWING MEDIUM

The invention relates to a device for manufacturing containers from a plastics material which can be formed by stretch-blowing, with a mould, the internal space of which corresponds to the finished container, which is held by its open end by a receiving portion, wherein lines connected to a metering unit are provided on the receiving portion, a moveable stretching die is guided through the receiving portion, and an ignition means is arranged in order to ignite an explosive gas mixture inside the container, and wherein heating and cooling means are provided.

A device of the type described hereinabove for manufacturing plastics containers, for example bottles from polyethylene terephthalate (PET) is known from international published document number WO98/06559. These PET bottles are manufactured in that firstly a blank is heated to a temperature suitable for stretch blowing, of approximately 100–120° C. This blank is inserted into a tooling mould corresponding to the shape of the container, and a stretching pressure of at least 2 bar, normally of 5–10 bar, is produced. With the aid of an axially, and in general vertically, moveable stretching die, the blank is stretched axially. Then, a blowing pressure is produced in the blank, which is in the region of 40 bar. In this way the wall of the blank is pressed against the inside wall of the mould, and in this way the container is formed. While the stretching pressure is created by blowing an explosive gas mixture into the blank, for example a mixture of oxyhydrogen gas and an inert gas, the blowing pressure is created by igniting the explosive gas mixture, and this blowing pressure presses the wall of the intermediate form, or respectively the partly pre-formed container, completely against the inside wall of the mould. In this way the PET bottle is produced. The ignition of the explosive gas mixture is done by a spark generator or an emission, and the explosive gas mixture is a mixture of an oxidising agent and a component which can be oxidised such as, for example, hydrogen, methane or the like. In the same process of stretching and blowing, by achieving a brief increase in temperature, sterilisation of the container to be manufactured is possible, so this technique is considered very advantageous.

It has been shown, however, that when converted to technology, the containers manufactured with the known device could not be used industrially. They could not be manufactured and were not reproducible with sufficient quality with respect to shape and volume, and also with respect to their optical appearance. It was for example, not possible to manufacture PET bottles with clearly transparent walls. To the extent that it was not caused intentionally or could be accounted for specific reasons, it was thought that this sometimes unattractive appearance was due to unavoidable effects of temperature.

The object of the invention is thus to provide a device of the type described in the introduction, with the aid of which plastics containers with a better appearance, for example with largely clearly transparent walls, can be manufactured without large additional expenditure.

This object is solved in accordance with the invention in that, on its end facing the container, the receiving portion can be engaged in a flowable medium-tight manner with a distribution module, through which module the stretching die is moveably guided in the axial direction, extending the receiving portion, and on which at least one connector for flowable media is fitted, in that the at least one connector for flowable media can be closed for sealing the device-side interior space, and in that ignition means is fitted in the device-side interior space. During the manufacturing process, the receiver is, in one stage, in sealed engagement with the distributor module, and in the other stage is disengaged from the distributor module. In the stretching stage, the stretching die is moveably guided through the distributor module and thereby also axially through the receiving portion.

In the case of one embodiment of the invention, a device-side interior space is formed by the parts of the device fitted together, these being the distributor module, receiving portion and the container located in the mould. With this embodiment, a flowable medium is conducted through the at least one connector for flowable media into the distributor module, and through this into the receiving portion and the container.

With another embodiment, the device-side interior space is formed by the same parts of the device, wherein, however, in addition flowable medium can also be supplied through the stretching die to the inside of the container.

In the case of a further embodiment, the device-side interior space is formed only by the container and the receiving portion arranged upon it, when, for example, the distributor module is separated from the receiving portion and the receiving portion is closed. The stretching die is conducted axially through the receiving portion, and said stretching die can include a supply line. It can, however, also be configured to be solid.

Each of the different device-side interior spaces (according to the embodiment) can be closed off in the area of the single connector for flowable media or the plurality of connectors for flowable media. Only in a closed device-side interior space does the explosion caused by the ignition means arranged externally thereto produce the desired parameters of a brief high pressure and increased temperature. Clearly, this interior space can be opened up again after the termination of the manufacturing process.

The advantage of the limited device-side interior space is its small volume. The volume in the container to be manufactured is then less critical. The container, and also preferably the receiving portion supporting it, are namely removed from the device after the respective manufacturing process, in order to be subjected to further processing. The device-side volume which was involved in enclosing the space for the explosion is, by means of the measures according to the invention, so small in relationship to the known device that reaction products, for example water when oxyhydrogen gas is used, remain in significantly smaller quantities. It has been established that the clouding of the container walls occurs because when oxyhydrogen gas is used, water formed in droplets is propelled with considerable kinetic energy from the inside onto the walls and there causes changes to the surface which in the end lead to clouding. With the first explosion, and also in the case of a continuous process for manufacturing only three to six containers, sufficient reaction product was still not formed in the device-side interior space, for example the supply and drainage lines, so there were hardly any water droplets present to cloud the internal walls of the container. With a longer continuous manufacturing process, because of the large number of successive explosions over time, there was, however, a large enough amount of reaction product (water) such that with each following explosion clouding of the container walls was unavoidable.

The closing off of a small device-side interior space, which is formed only from the interior space of the distributor module, the receiving portion and the container itself, in particular does not allow any accumulation of the unwanted reaction product (water), in that at least container itself, and preferably from the container and receiving portion is removed after the explosion, and thereby the accumulated reaction product as well. Insignificant amounts of reaction product therefore remain in the remaining device-side interior space which, even in a continuous manufacturing process, can still be ignored after a long period.

By means of this change in the construction technique of the device, it is unexpectedly possible to manufacture, without a large cost increase, plastics containers with a better appearance, in the case of PET bottles having largely clearly transparent walls.

The invention is further advantageously configured, in that the receiving portion is hollow and is provided in its end facing the container with a sealing surface through which the stretching die is conducted moveably in the axial direction extending the receiving portion. The receiving portion is preferably hollow so that the stretching die can be moved through the whole elongately configured receiving portion from one of its ends axially to its opposite end. At the same time, the receiving portion can be connected to the distributor module in a flowable medium-tight manner by means of the sealing surface which extends around the space for the stretching die, and is thus annular. It is advantageous when the stretching die is guided through this annular sealing surface in a flowable medium-tight manner so that optionally a flowable medium, preferably gases, can be forced from the distributor module through the receiving portion into the container to be manufactured, without the gases getting outside the device. By means of the hollow configuration of the receiving portion, not only can the stretching die be guided through into the container and drawn out of it again, but flowable media can also be conducted between the external surface of the stretching die and the internal surface of the receiving portion into the container, and additionally the volume inside the receiving portion is kept relatively small. In particular, the space provided for the explosion can be limited to the device-side interior space described, ensuring that chemical reactions do not place in the supply lines when reaction products occur.

It is furthermore advantageous according to the invention when the closing means for sealing off the device-side interior space is a non-return valve. Non-return valves are known per se in many various configurations. A non-return valve can be fitted to each connector of the distributor module when the embodiment is selected in which the distributor module belongs to the device which provides the device-side interior space. Another configuration of non-return valve can also be provided in addition or alternatively on the stretching die, optionally even in the stretching die, as will be described hereinafter with reference to a preferred embodiment. The device-side interior space, in the case of an advantageous embodiment, is formed by the container to be manufactured and the receiving portion, when this assembly can, for example, be separated from the distributor module.

It is further advantageous in accordance with the invention when the stretching die is configured hollow and is provided with at least one outlet aperture arranged on a stretching die tip, at least one flowable medium inlet, and with at least one internal channel connecting them, and when preferably in the area of the outlet aperture there is fitted a non-return valve. In the case of the hollow stretching die described here, the non-return valve is thus located in the stretching die, and thereby in the area of the outlet aperture.

Stretching dies for the stretch blowing process are known per se. The preheated blank is stretched with the aid of the respective stretching die in that its stretching die tip engages with the base of the blank, and pushes it away. In the case of the embodiment being considered here, it is possible to arrange an internal channel in the longitudinal direction of the stretching die such that the flowable medium can be pushed from its supply-side end to the opposite side in the direction towards the stretching die tip, and out of the outlet aperture. With this embodiment, at least one gas can be transported through the internal channel in the hollow stretching die into the space inside the container to be produced, as the flowable medium at the outlet aperture adjacent to the stretching die tip can be brought directly into the volume of the container.

With another embodiment, in addition to the flowable medium inlet with an internal channel in the hollow stretching die described, connectors for flowable media can be provided, for example, on the distributor module, so that different gases can be supplied through different lines. In this embodiment too, it is always ensured that in the supply lines no combustion, and therefore no chemical reactions, can take place when, for example, the explosive gas is ignited in the volume of the container to be manufactured.

In a preferred embodiment, before ignition of the explosive gas mixture, the non-return valve in the hollow stretching die is closed. Combustion cannot take place then in the internal channel in the hollow stretching die. Because the supply and drainage lines for the flowable medium, preferably for the gases, are closed and separated from the device-side interior space before the explosion, the volume for the chemical reaction, particularly for combustion, is entirely limited to the device-side interior space. With smaller amounts of flowable media involved in the combustion, smaller amounts of reaction products also occur, so advantageously there is little fear of damaging or affecting the internal surfaces of the container to be manufactured. In this way, the appearance of the container walls can be considerably improved. Moreover, all the advantages of the known stretch-blowing process can be made use of, including sterilisation by combustion.

It is further advantageous according to the invention when in the area of the outlet aperture an ignition means is fitted inside the hollow stretching die on the side of the non-return valve facing away from the outlet aperture, and preferably is electrically connected via cables or conductor pathways to a control unit. The ignition of the explosive mixture of flowable media can take place almost in the centre of the container to be manufactured, using such a design for the hollow stretching die. Parts of the device set further outside the container can then be disengaged or closed according to the process. The actuation of the ignition means via the cable or conductive pathway also takes place advantageously through the hollow configuration of the stretching die. The connection of the non-return valve causes no interference, but instead it is preferably selected such that the whole internal channel in the hollow stretching die can be separated by means of the non-return valve from the explosion space, namely by closing the non-return valve.

In a further advantageous configuration of the invention, the hollow stretching die, which is driven such that it is moveable in the longitudinal direction, is a steel tube with a cap-shaped stretching die tip on which the flowable medium outlet is provided as a hole structure, wherein the non-return valve is provided with a valve body movable with respect to a sealing seat fitted inside the steel tube, and preferably carrying turbulence producing means. The hollow stretching die can in practice be made from a steel tube of stainless steel, the stretching die tip of which is nevertheless provided with a cap which is exchangeable, and consequently matching the properties of the respective blanks to be formed, as during the process said cap stretches the pre-heated blank by engaging with its base. The flowable medium outlet is fitted to the cap-shaped stretching die tip, preferably in the end region of the steel tube, where the stretching die tip is connected to the steel tube by means of a screw or another fastening means. As far above this as possible on the stretching die tip, the flowable medium outlet is located. It has a hole structure. This means that at least one hole is arranged in the external wall of the tube such that the gases or other flowable media flowing through the internal channel of the hollow stretching die can exit from the steel tube through this hole or respectively through a suitable number of holes. It is also possible for the flowable medium outlet to have a different exit arrangement with regularly or irregularly distributed holes. A hole structure can also be understood as a porous body of sintered metal, ceramics or the like which can then act at the same time as non-retum protection.

A preferred embodiment of the invention uses a hollow stretching die with a non-return valve which is also arranged in the area of the stretching die tip, however at a certain distance from it which is used on the one hand for receiving the flowable medium outlet, and on the other hand for the ignition means. The non-return valve in this embodiment has a valve body which can be moved with respect to a sealing seat inside the steel tube such that in this way the non-return valve is closed. If such a stretching die is arranged with strongly vertical components, preferably completely vertically, in the device according to the invention, the valve body exerts, by means of its weight, a kind of spring tensioning downwards against the sealing seat, so without a flowable medium flowing out of the internal channel, because of its weight the valve body always falls down onto the sealing seat and thereby closes the non-return valve. Obviously, the closing of the non-return valve can also be obtained in some way by building in a spring, which is necessary in particular when there is a non-vertical arrangement of the stretching die. Ignition takes place in any case in the device-side interior space, that is to say in the upper remaining space in the steel tube adjacent to the flowable medium outlet and outside the stretching die in the volume of the container, so the gas pressure increased by the explosion additionally presses the valve body against the sealing seat and closes the non-return valve.

The valve body can preferably carry turbulence-producing means. In this way a better turbulence of the flowable media mixture is obtained when it leaves the stretching die. For example, the moveable valve body can be provided with flowable medium guides running in a spiral shape on its external surface. Alternatively, outlet holes can be bored diagonally in the stretching die in order to give the exiting flowable medium a tangential speed component.

In the steel tube of the hollow stretching die, in other embodiments or alternatively in addition to the measures in the context of the embodiments described hereinabove, means are provided for good mixing of the flowable media. Thus, Christmas-tree-shaped components provided with lateral paddles can be provided in the hollow stretching die in order to improve turbulence of the flowable media while they are being conducted through.

The cap-shaped stretching die tip can be manufactured from different materials, wherein it can be made of solid plastics, of a plastics-coated steel cap, or of ceramics. A device has also already been operated and evaluated in which the stretching die tip is composed of steel. The reason for using steel instead of plastics, and for testing it, is to avoid excessive heating, and therefore affecting of the external surface of the stretching die in continuous operation.

It is advantageous according to the invention when the receiving portion is driven moveable perpendicularly to its longitudinal central axis. In this way it is unexpectedly possible to transport away a large part of the device-side interior space, namely the space in the hollow receiving portion, after each stretching and blowing process, that is to say in particular after each combustion, together with the reaction products adhering to the walls, from the remaining stationary device, for example, the distributor module with the hollow piston. All these reaction products take no part in the subsequent process of stretching and blowing, and in particular in the chemical process of combustion. The device-side interior space, which can nevertheless be coated with reaction products, is then limited to the space in the upper stretching die and in the distributor module. When an oxyhydrogen gas is used, so little water is taken along as a reaction product to the following combustion process, that affecting of the internal container walls during and after the explosion is not a risk.

Furthermore, a preferred embodiment of the invention is characterised in that the receiving portion is widened at the end facing the distributor module to form a service space in which, preferably, a centering is placed. The respective container to be manufactured has, in the case of a PET bottle, on one long end the infilling and respectively pouring aperture in the form of a band with an external thread. In the case of the known device, the receiving portion grips around this open end of the container. Also according to the invention, the container to be manufactured is retained most practically at its open end which is preferably in the form of a band with an external thread. The filling of a sterilised container is done through this infilling and respectively pouring aperture, which can also generally be described as a closure. In order that the sterile contents does not come into contact with germ-laden surfaces externally or internally on the closure, it would be advantageous when not only the inside of the container is sterilised during the combustion process in the process according to the invention, but the upper annular edge on the end face, and if possible even the thread are sterile on the outside. If according to the teaching of the invention the receiving portion is widened at the end where the container is received, there is formed an albeit small additional volume for the gas involved in the combustion, which adjoins the surface of the external thread and sterilises it during the blowing process.

It is also preferred when in this widened service space there is fitted a centring, as then both the blank and the future container can be well centred and retained. Although the centring is an additional part, which partially fills the service space, the contact with the sterilising gases during and after the combustion is not hindered or affected by it, particularly as an edge flange additionally acts as a retainer.

It is further advantageous according to the invention when in the preferably stationary distributor module a hollow piston, driven axially moveable relative to said module, is provided, which has on its external end opposite the receiving portion an annular opposing sealing surface fitting the receiving portion. The distributor module can be also constructed in one piece, and connected in a sealing manner with a correspondingly moved receiving portion such that this connection between the receiving portion and distributor module can be terminated in a controlled manner. The termination is, however, done by means of the existing measures particularly advantageously with the hollow piston. In order to connect the distributor module to the receiving portion, and respectively to disconnect it, neither the distributor module nor the receiving portion needs to be moved axially—approximately in the direction of the hollow stretching die—as the hollow piston is driven axially moveably, preferably pneumatically. On its external end, the hollow piston carries an opposing sealing surface fitting the receiving portion, which surface comes into sealing engagement with the sealing surface of the receiving portion when the receiving portion is connected to the distributor module. After the blowing and sterilising process, the movement of the hollow piston is reversed, so the sealing surface is disengaged from the opposing sealing surface, and then the receiving portion can be displaced in die manner described hereinabove perpendicularly to the direction of its longitudinal axis. This displacement transportation takes place each time following a blowing-sterilising procedure in the step-wise operating manufacturing process. According to the invention, in the distributor module, for guiding the stretching die, a sealing passage can be fitted in alignment with the hollow piston. With this, the movement of the stretching die in the axial direction through the distributor module, the hollow piston hereof, the receiving portion connected thereafter, and into the container, and respectively out of these parts, takes place whether the device-side interior space remains closed off in a gas-tight manner.

According to the paths of the flowable medium through the stretching die, past it or both of these, it can be advantageous when according to the invention at least one supply and connected to the metering device, and a drainage line, is connected to the distributor module. The drainage line serves to remove the reaction products, for example of the combustion gases, and optionally flowable residues.

The supply line is connected to the metering unit, which will be described hereinafter in more detail with reference to a preferred embodiment. There can be supplied, for example, for oxyhydrogen gas, hydrogen through one supply line and a mixture of oxygen and an inert gas through another supply line. With this it is advantageous when a flowable rinsing agent is forced from a further supply line to drive the reaction products out of the drainage line.

It should be noted that pressure sensors and temperature measuring devices could be arranged at different places in the device, preferably in the area of the distributor module, but also in the hollow stretching die.

It is also clear, that the ignition means can work on different physical principles. The ignition of the mixture of media takes place electrically in the most simple case by means of a spark discharge, made for example by a spark plug which can be fitted on the stretching die or on the distributor; or by means of static discharge. Other ignition methods are conceivable, for example by beaming electromagnetic energy, in the form of a laser, high frequency or microwave pulse, or with the aid of a catalytic procedure.

Another advantageous embodiment of a metering unit provides the mixing of different flowable media directly in front of the stretching die, with directly following introduction into the blank. Particularly from the safety aspect, this represents a good compromise between the manufacturing of the mixture in a separate, explosion protected pressurised container and the metering unit described hereinabove, in which by means of metering cylinders individual flowable media and/or mixtures of flowable media are supplied to the device-side interior space.

A practical embodiment is further characterised according to the invention in that in each of the supply and drainage lines connected to the distributor module there is connected a non-return valve, and the ignition means is housed in the distributor module. The stretching die is then surrounded by the space in the distributor module, the space between the stretching die and hollow piston and that between the stretching die and receiving portion with a gap. This gap means an annular space which can be seen as a channel for flowable media and can be set out accordingly. When set out larger, larger quantities of flowable media can be pumped into the container, and vice-versa. The explosion triggered by the ignition means in the distributor module then propagates itself very rapidly into the entire space filled with flowable medium. This space is limited by the non-return valves on the lines to the distributor module.

In an advantageous further configuration of the invention the hollow piston has on its end facing the receiving portion an annular sealing seat, and the stretching die carries on its end which is moveable into the container to be manufactured a radially widened portion perpendicular to its longitudinal axis for engaging with the sealing seat. This can be ball, cone or ring-shaped or the like. In this embodiment the stretching die is solid and can be configured with a smaller diameter with the result that a greater flow channel is available for the flowable medium outside the stretching die. This encourages a rapid, brief manufacturing process. The space provided for the explosion is closed off by withdrawing the stretching die and thereby introducing the widened portion into the sealing seat without the necessity for further non-return valves, wherein then the ignition means simply has to be arranged in the area of the receiving portion.

Another radial widened portion of the stretching die is also conceivable in its central area, wherein when there it is better to describe it as a step. This widened portion can then also close off the space for the explosion by engaging with the sealing seat on the hollow piston, while the stretching die still remains in the extended stretching position. In this way, the process time can be further reduced, as the stretching die does not have to be firstly withdrawn from the container before the explosion can be triggered.

It can be advantageous when according to the invention the cooling means described in the introduction are used to separately cool the stretching die. This can indeed reach a temperature of 100° C. or more even after several steps in the step-wise continuous operation, so the materials of the device are subjected to a high degree of stress. It is then advantageous to limit the temperature of the moveable stretching die, and this can be done well, despite repeated explosions, by providing suitable cooling means.

Although the internal channel of the hollow stretching die was previously described as a supply line, clearly the supply of the mixture can also be via the distributor module and the removal of the reaction products correspondingly via the stretching die.

Figure 2:
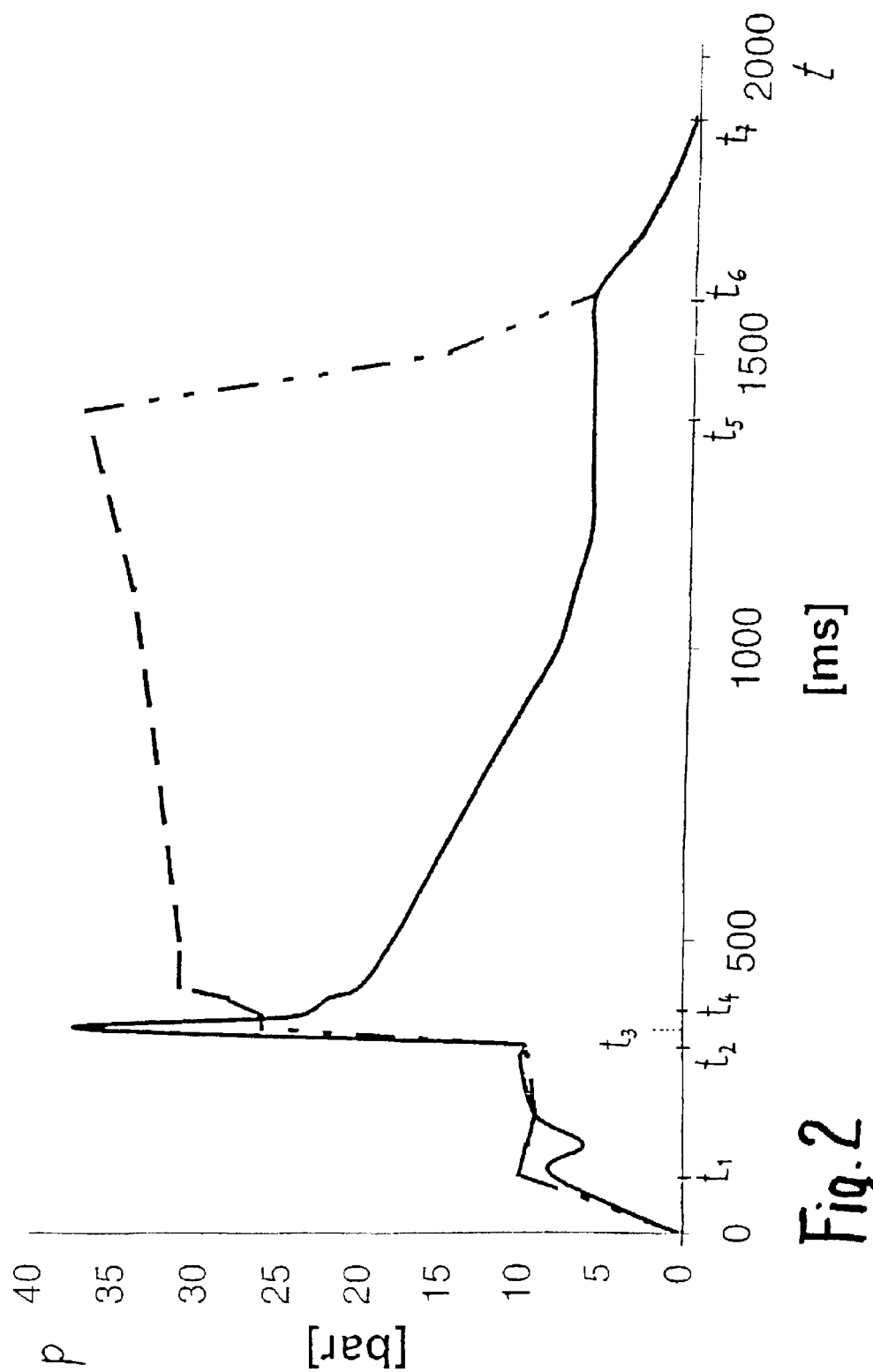
Figure 3A:
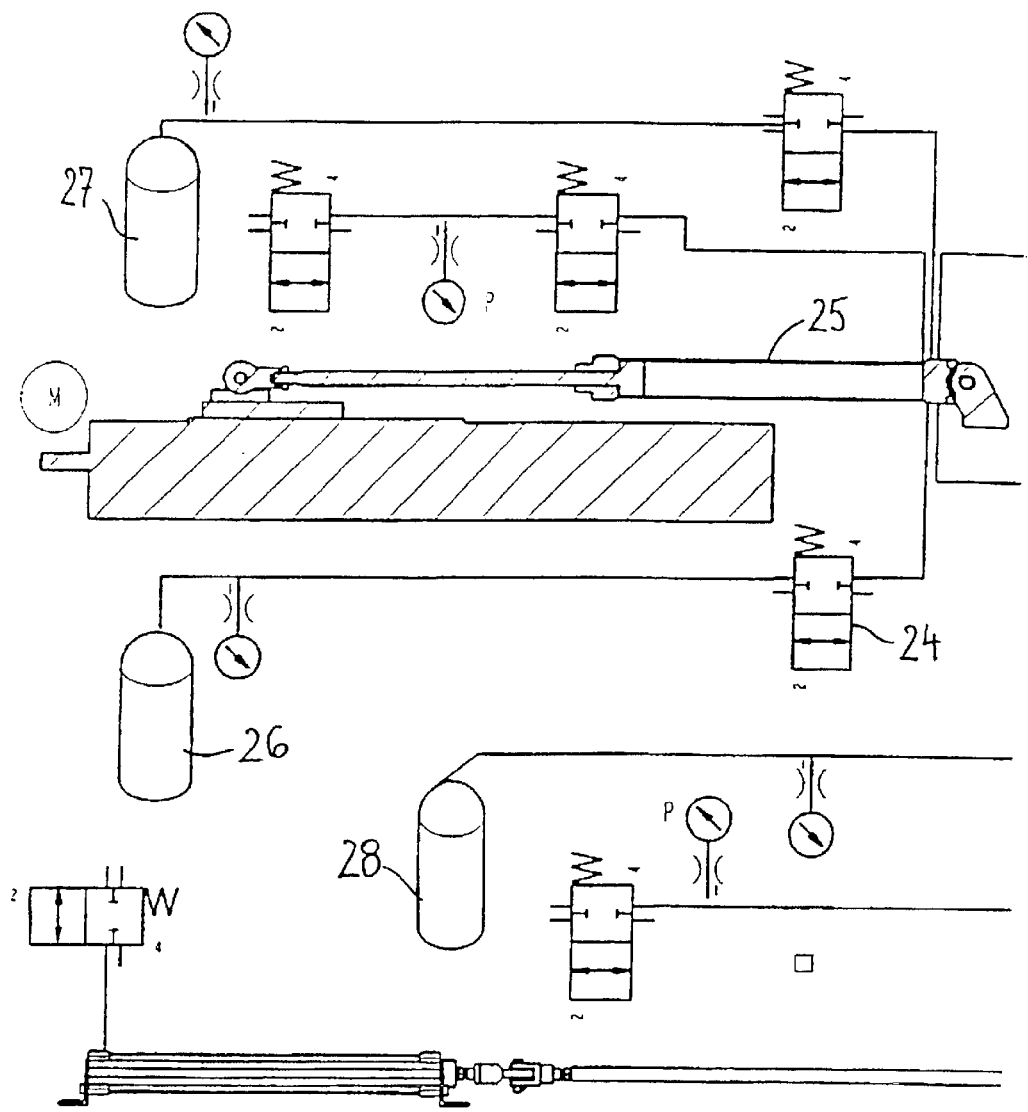
Figure 3B:
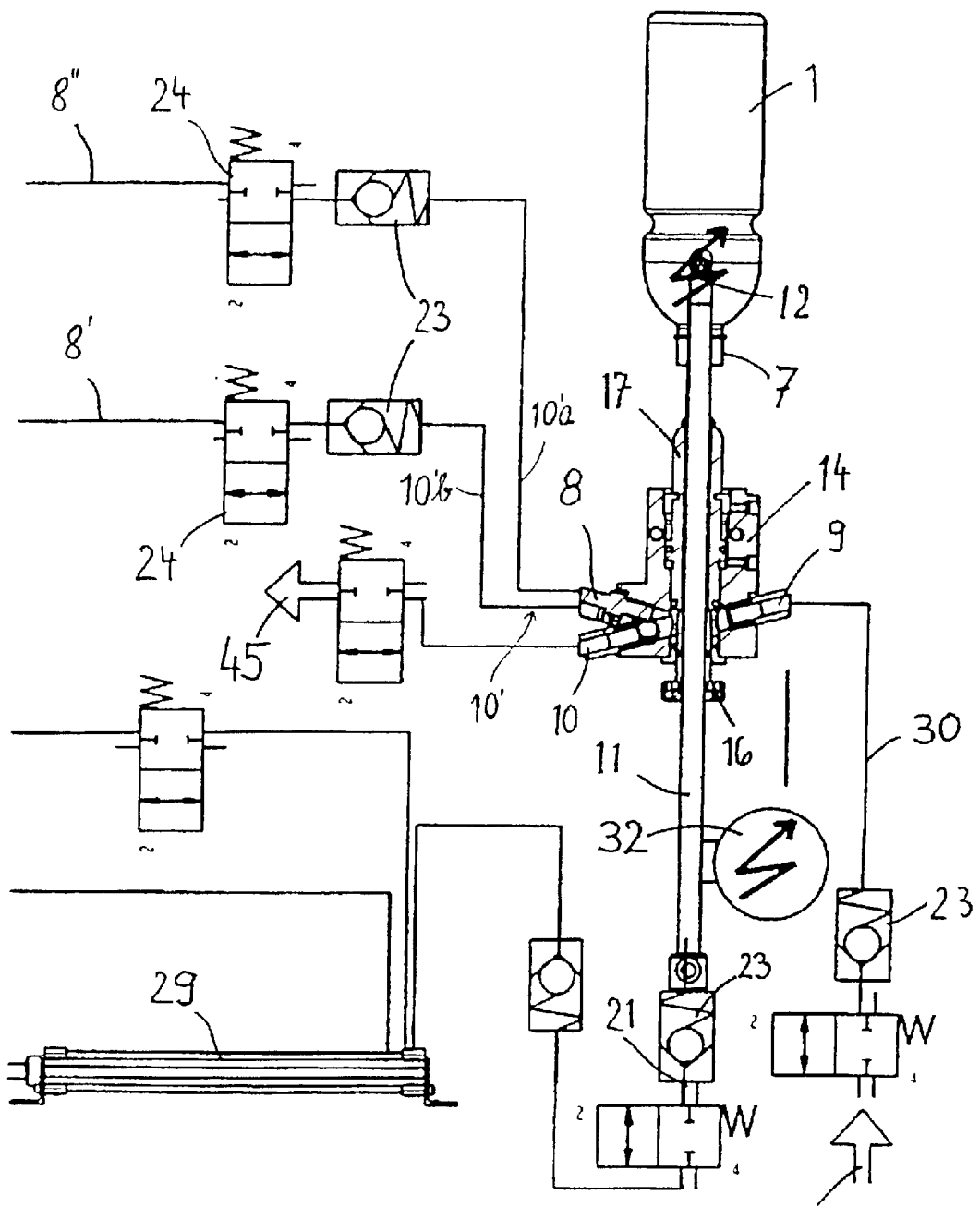
Figure 3C:
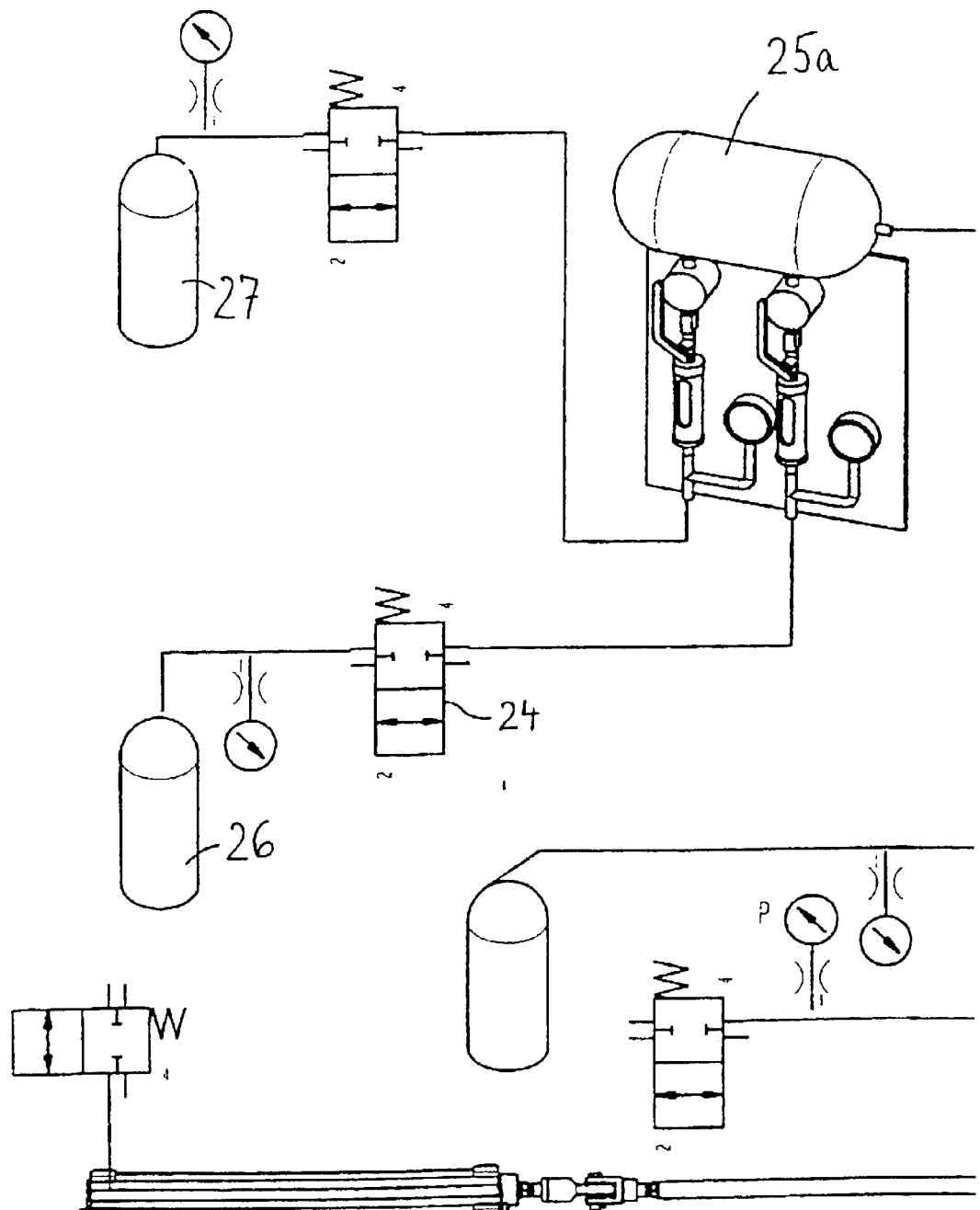
Figure 3D:
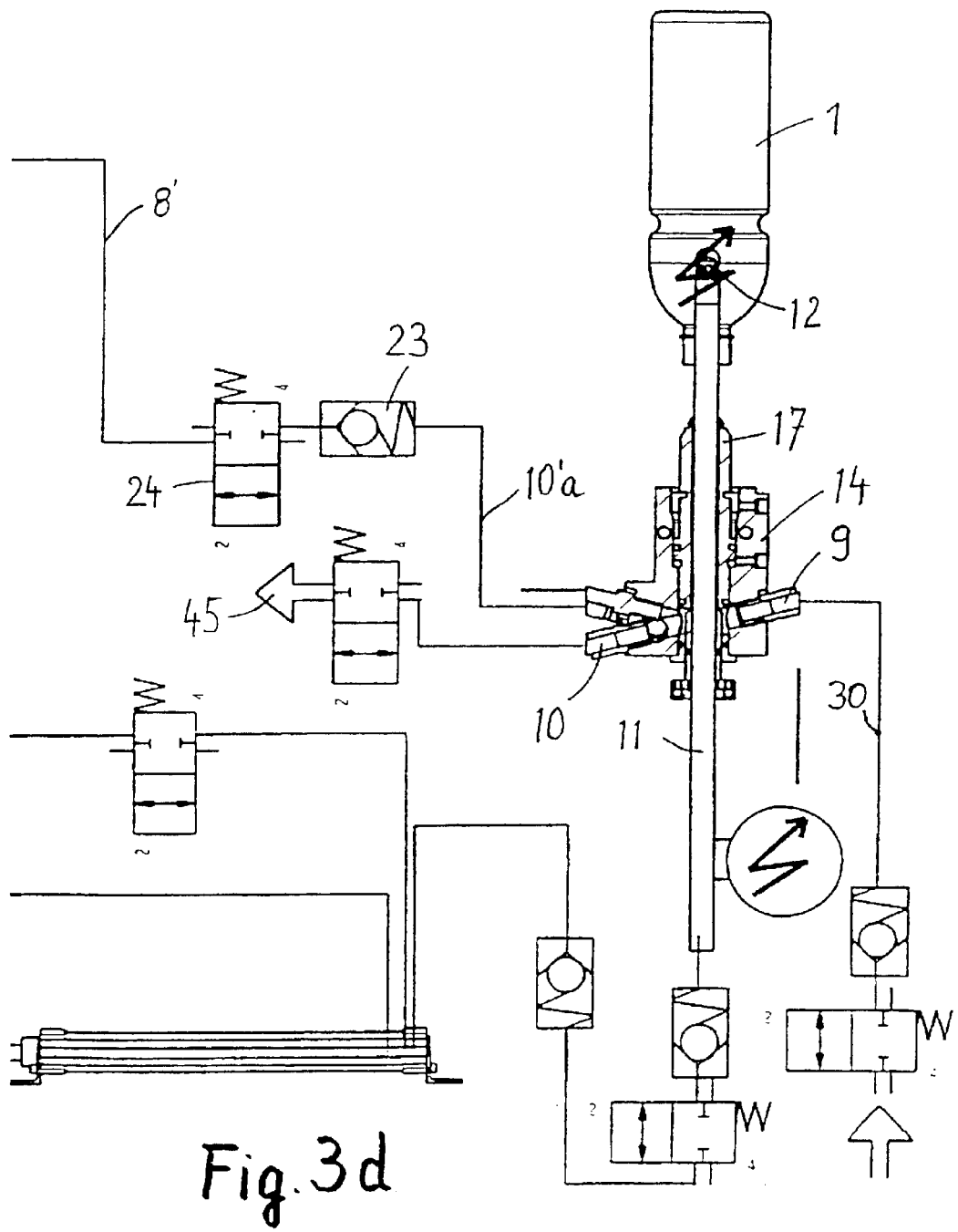
Figures 4, 5:
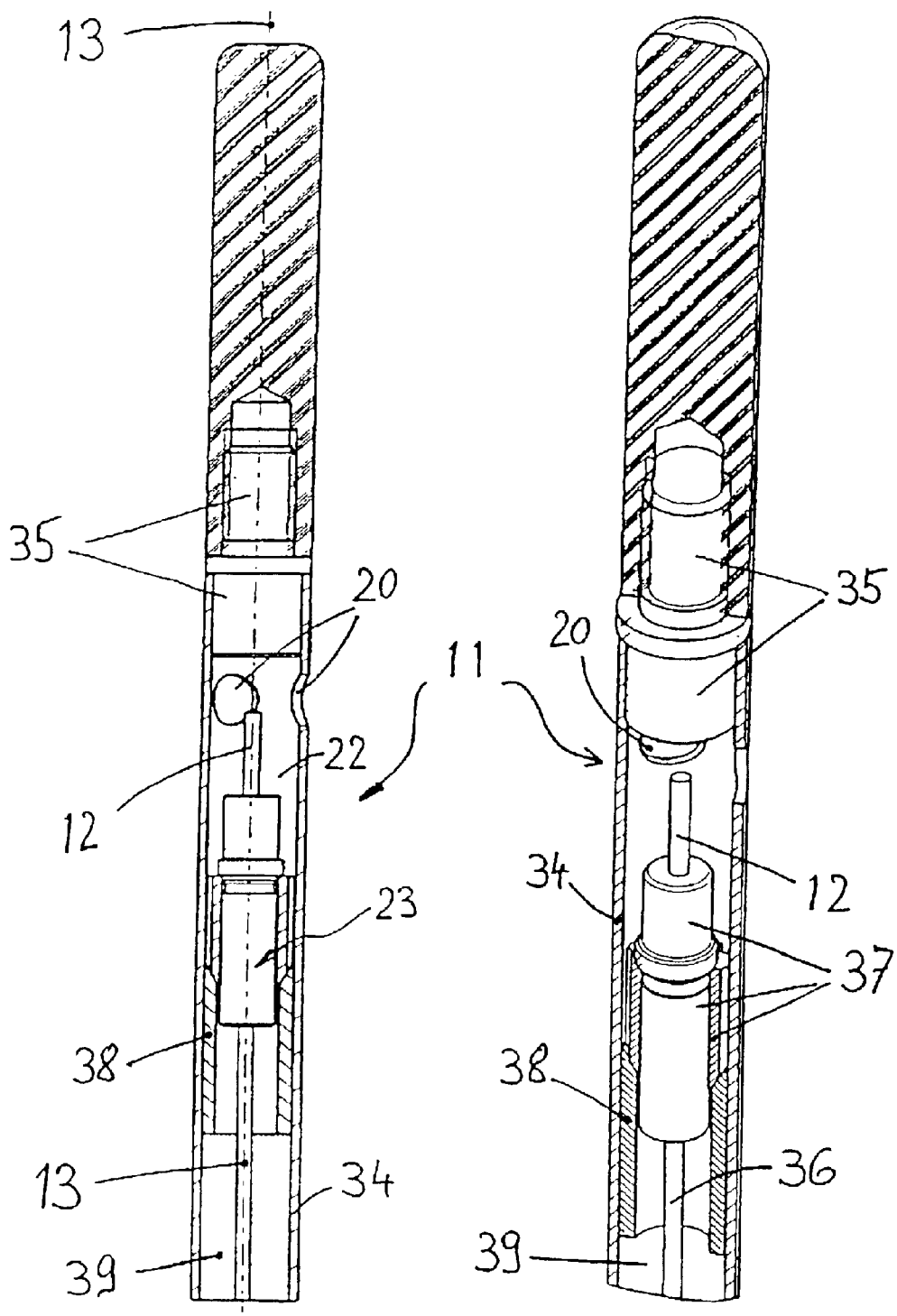
Figure 6:
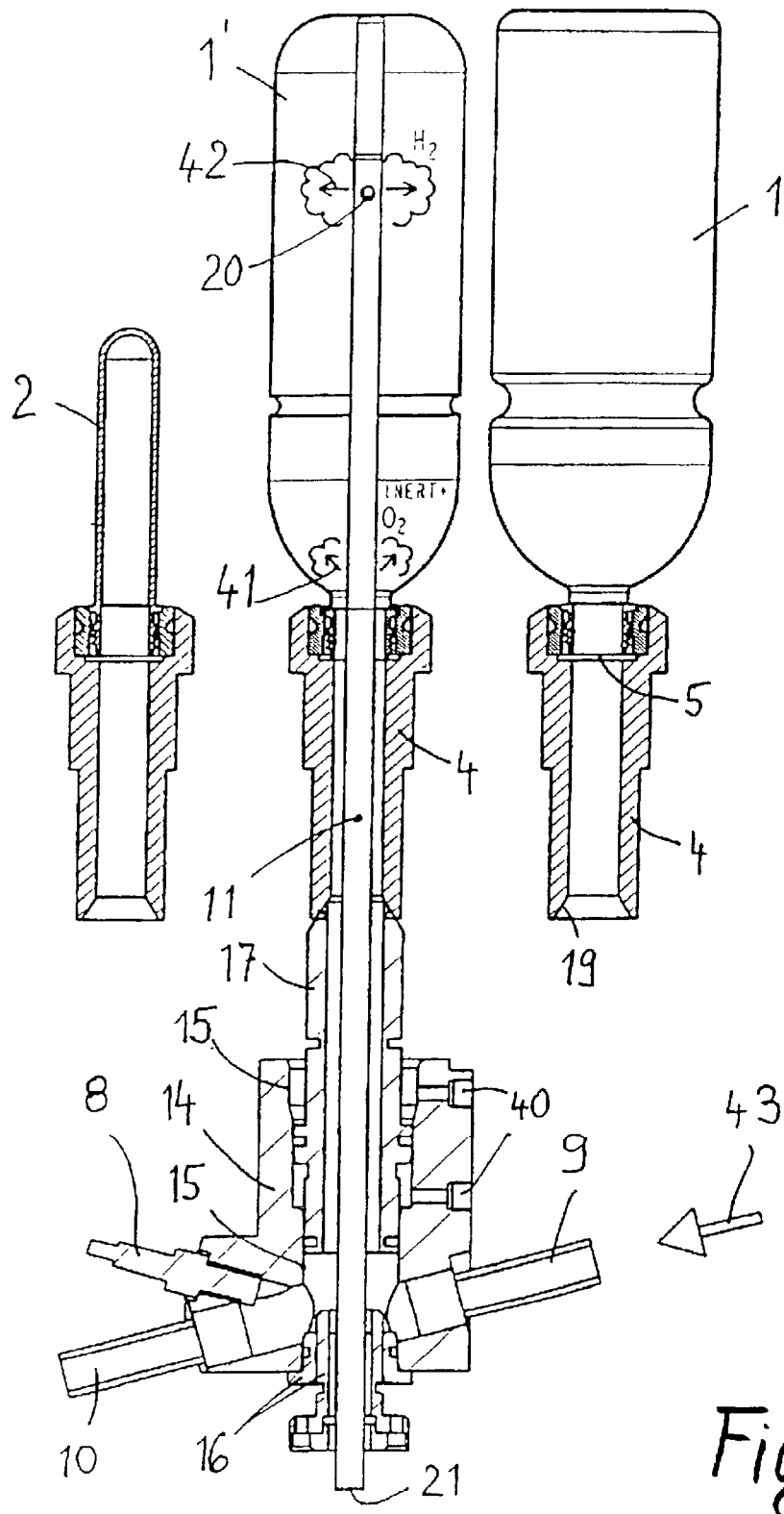
Figure 7:
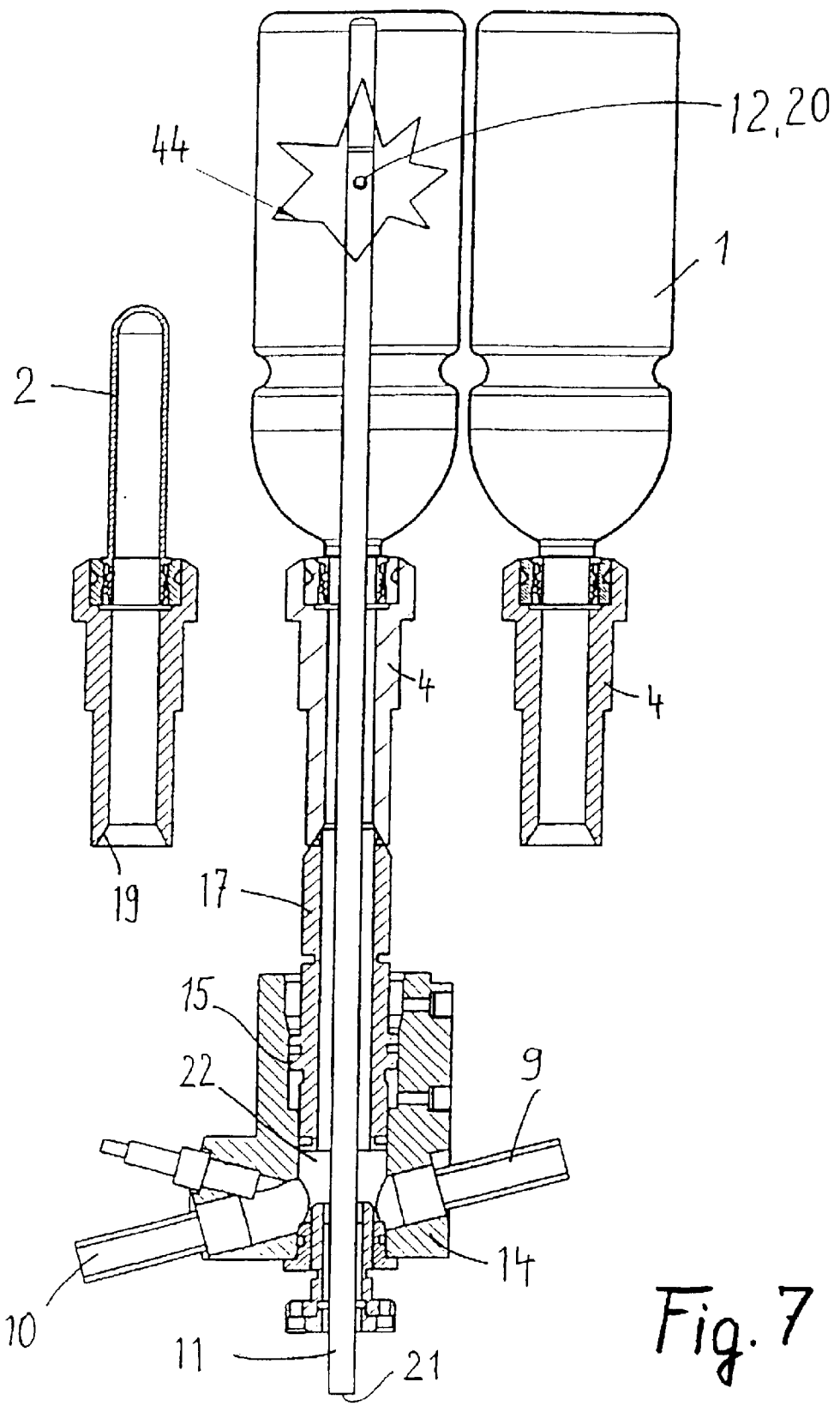
Figure 8:
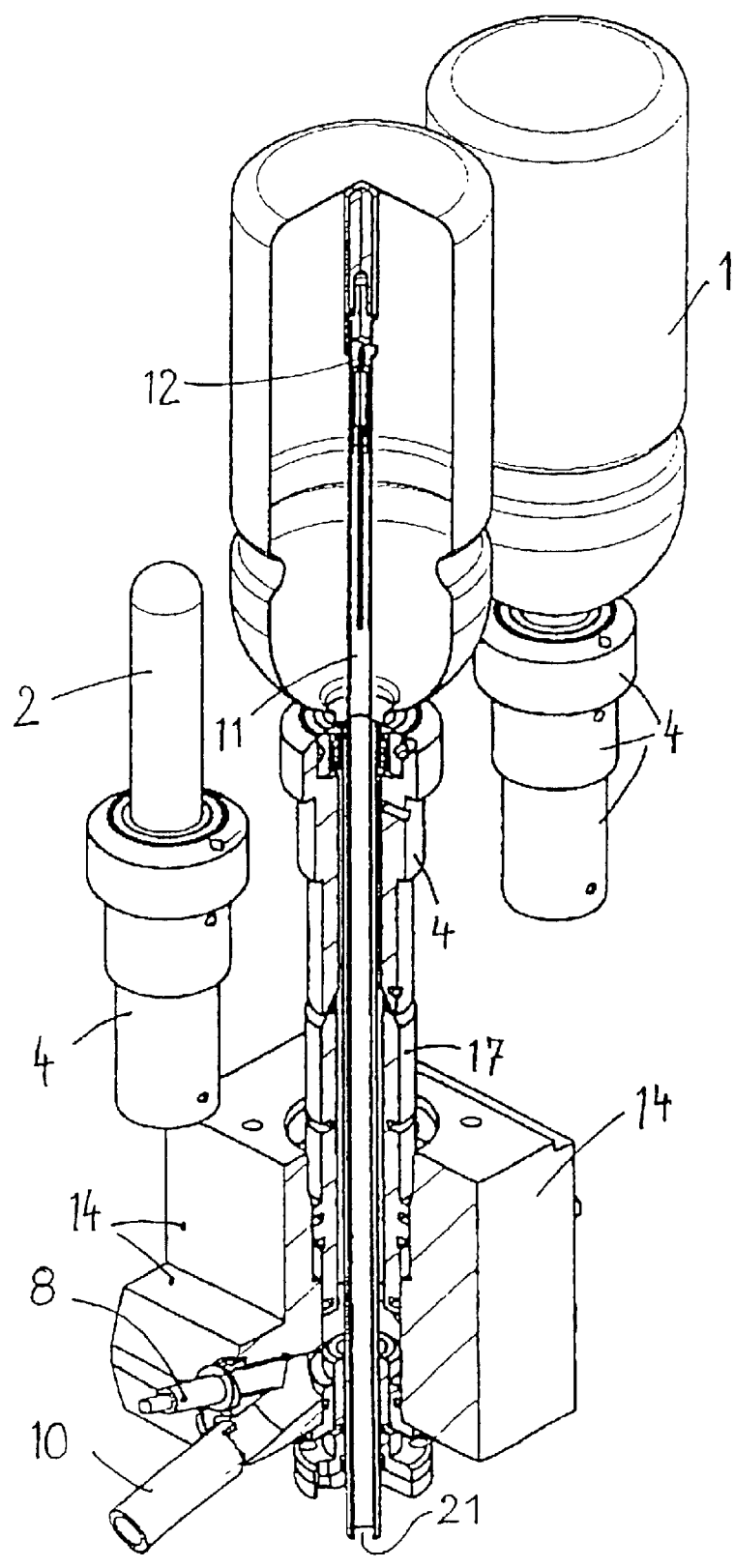
Figure 9:
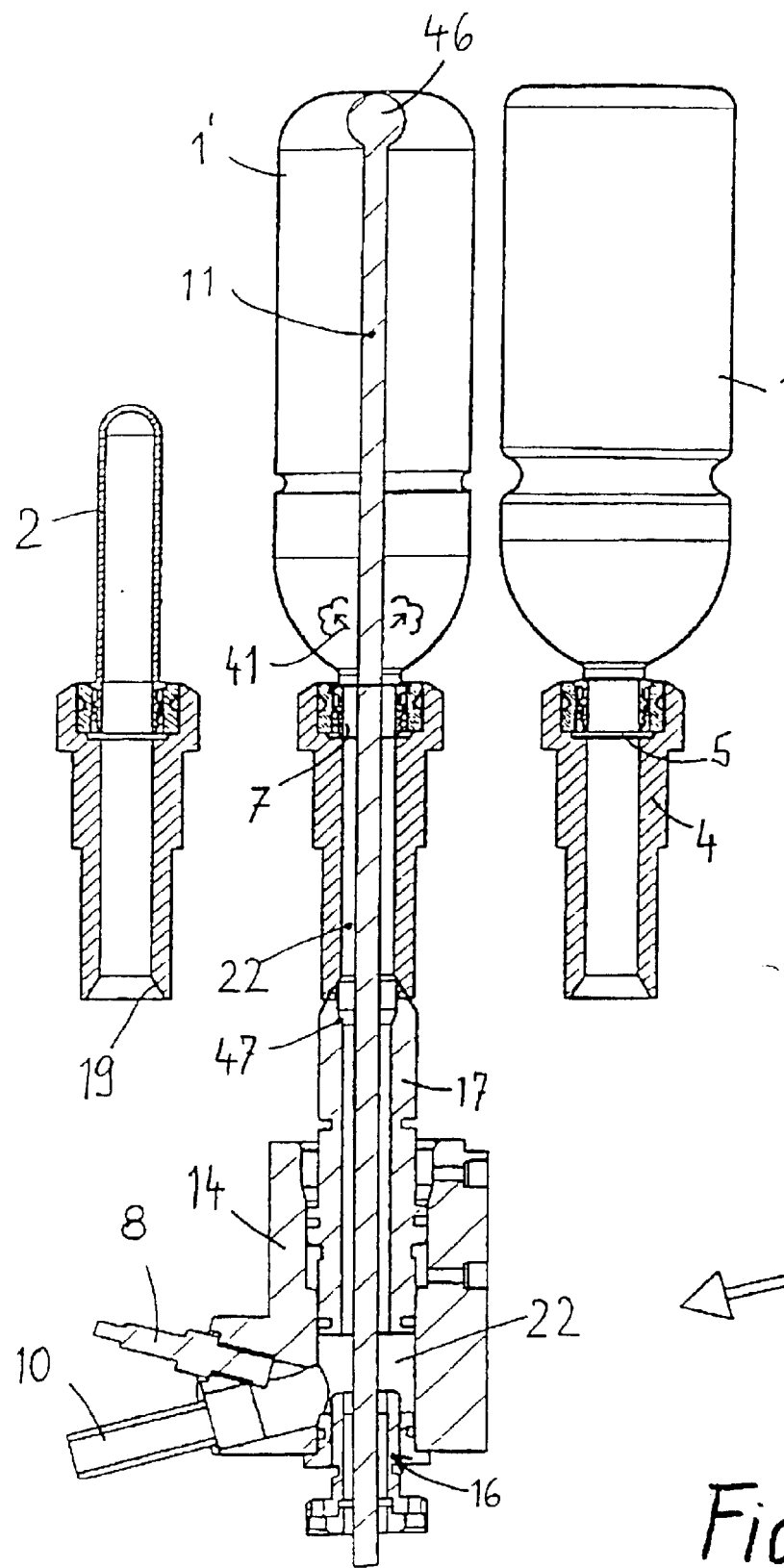
Figure 10:
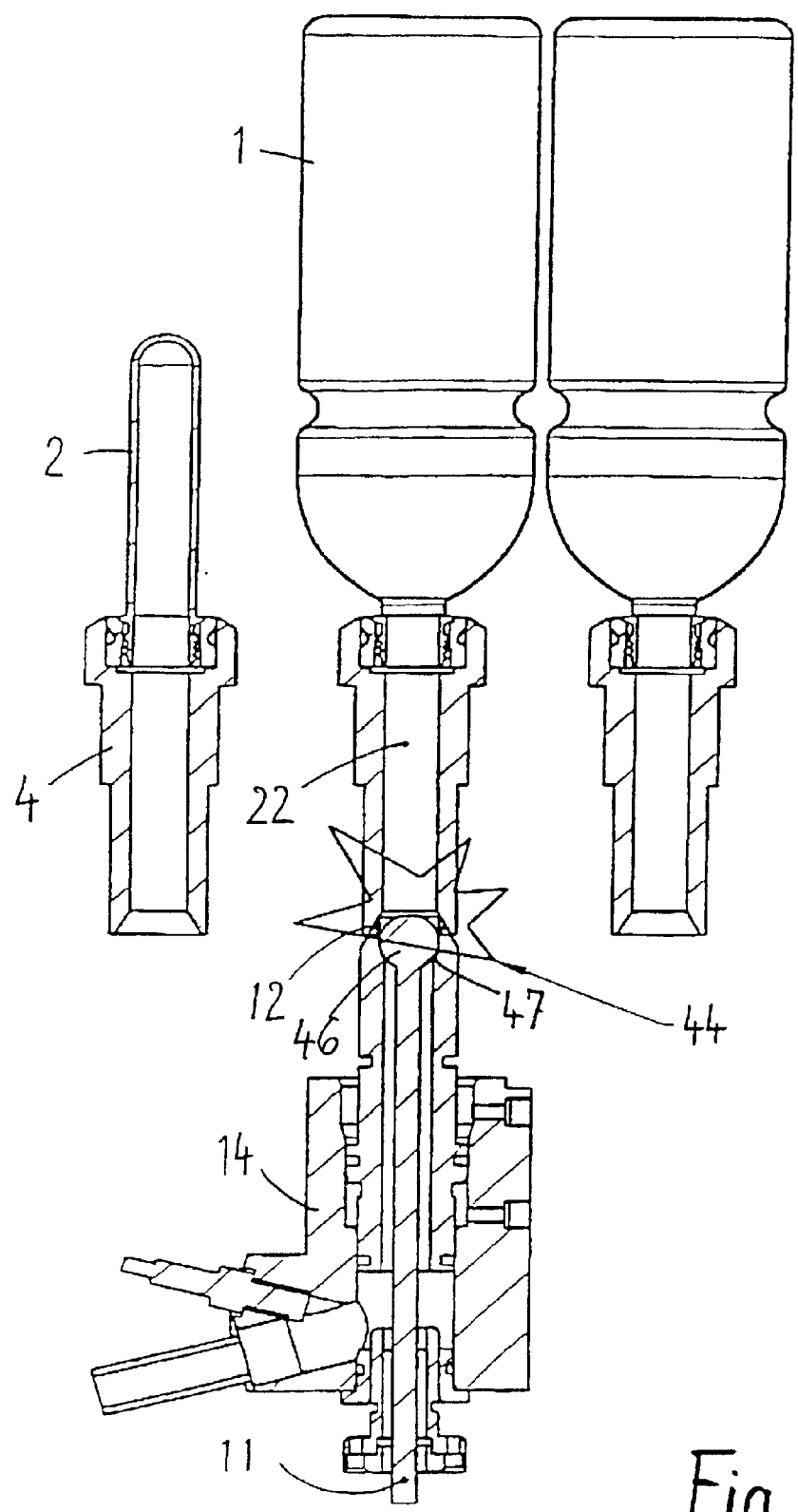
Figure 11:
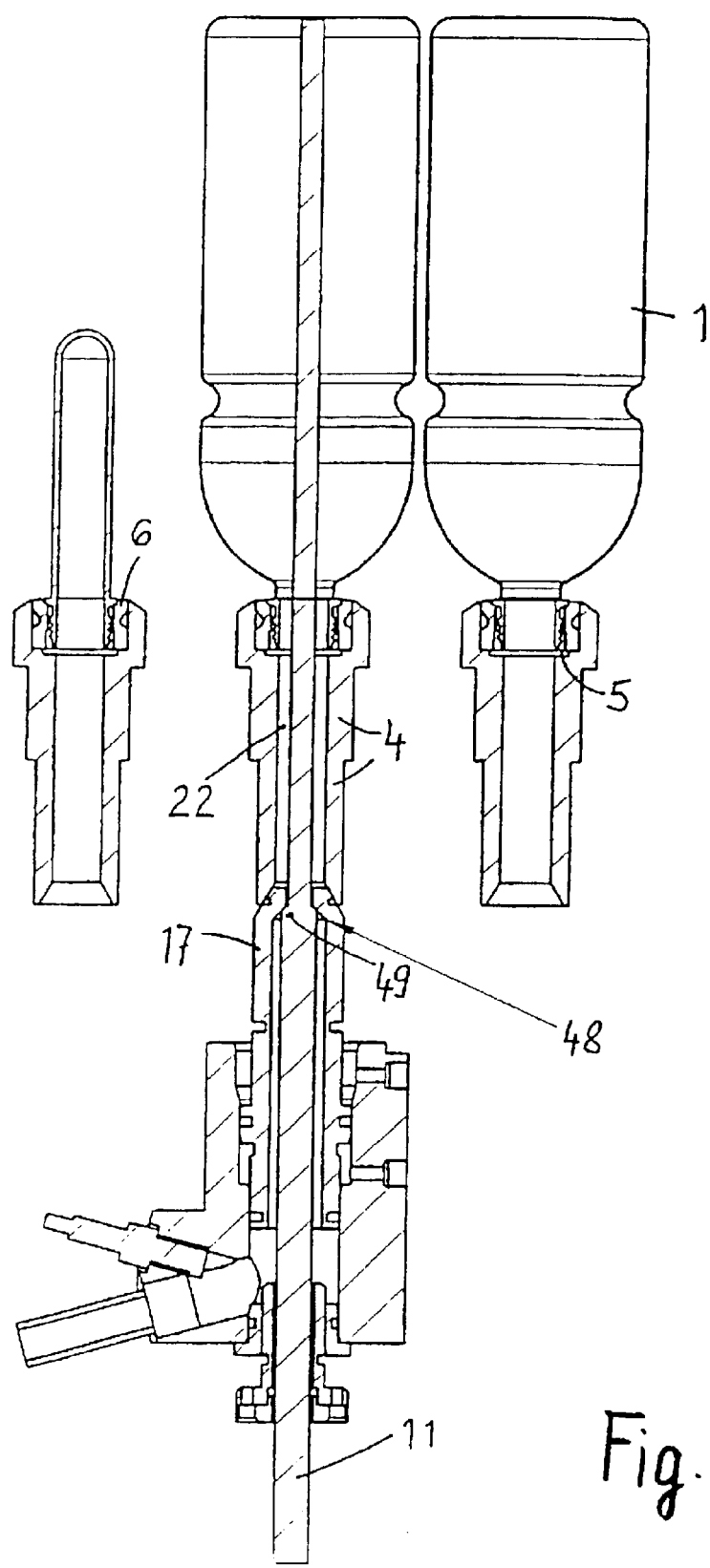
Figure 12:
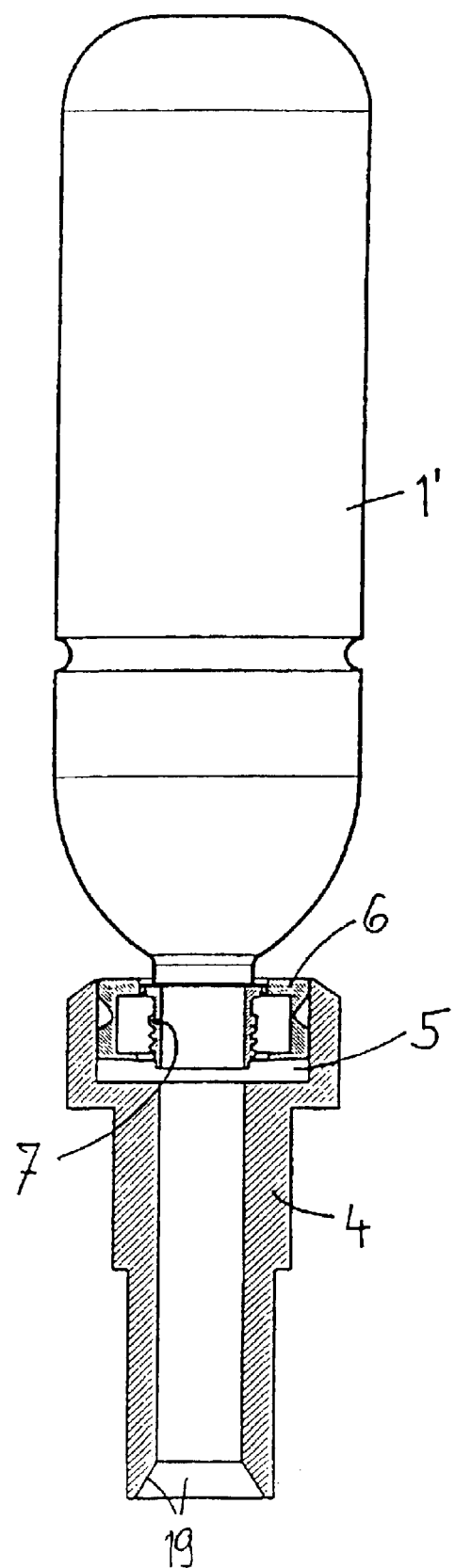

Further advantages, features and possibilities for application of the present invention will be evident from the following description in combination with the attached drawings, which show preferred embodiments. There is shown, in:

FIG. 1 in section, the transporting of blanks and completed blown containers by means of a distributor, FIG. 2 a diagram of the development of pressure over time in the blank, and respectively the container to be manufactured, FIG. 3a the left-hand half of a first embodiment of a metering unit, which continues to the right with the lines interrupted, FIG. 3b the right-hand half of the metering unit of FIG. 3b, that is to say the continuation of the lines from the left, with the stretch-blown container above right, FIG. 3c the left-hand half of a second embodiment of a metering unit which also continues to the right with the lines interrupted, FIG. 3d the right-hand half of the metering unit of FIG. 3c analogous to that of FIG. 3b;

FIG. 4 in an enlarged scale, the upper and respectively container-side end of the hollow stretching die, FIG. 5 the same end of the stretching die as in FIG. 4, shown in cross-section, in this case in perspective, FIG. 6 an operating state of the device, in which compared to FIG. 1 the distributor arranged in the centre at the bottom is connected in a sealing manner to the receiving portion, wherein the container is pre-stretched and formed, FIG. 7 another state of the stretching-blowing process, in which forming is done by explosion, FIG. 8 the same step of the process as in FIG. 7, however in perspective and partially cut away, FIG. 9 with another embodiment, a similar process step as in FIG. 6, wherein however the pre-stretching and forming is done by a differently configured stretching die, FIG. 10 the same embodiment as in FIG. 9, but with forming by explosion, FIG. 11 a similar illustration of the device as in FIGS. 7 and 10, wherein a different type of stretching die is used, and FIG. 12 enlarged, in cross-section, the receiving portion wit the centering fitted above, by means of which the container to be manufactured is supported.

FIG. 1 shows cut-away at the top right a container 1 manufactured by the stretch-blowing process made from plastics, for example, PET. While the completed container formed and removed from the tool is labelled 1, the container partly pre-formed by stretching and blowing is labelled 1' in the following drawings. The container 1 is manufactured from a blank labelled 2. Only the parts of the entire manufacturing unit which are important for the invention are shown, while parts of the tool known per se are omitted, thus, for example, the mould, the interior space of which corresponds to the finished container 1. The retainers and rails for transporting the workpieces according to the arrow 3 into the processing station and out of it are also omitted in the drawing. The receiving portion 4 is shown, however, which is widened at the upper end to form a service space 5, in which a centring 6 is fitted.

The container 1 to be manufactured is in this case shown as a PET bottle, which is arranged with its open end 7 upside down, facing downwards, and supported in the centring 7 and retained in a sealing manner in the receiving portion 4.

On the receiving portion 4 lines are provided axially, later described in more detail according to the embodiment, which can be connected to the receiving portion 4 and are removable from it such that the receiving portion is freely moveable with respect to the lines and the tool parts carrying them. These lines are in turn connected to a metering unit described in more detail in FIGS. 3a and 3b. In FIG. 1, the lines 9 and 10 are shown, the connection of which to the metering unit is shown in FIG. 3b. It is clear that depending on the place selected for producing the mixture—the metering unit, distributor module or blank—the distributor module can include several supply lines 10, 10' instead of a single supply line 10. A pressure sensor 8 in the distributor module can be used for process control. The second supply line 10'a and third supply line 10'b (the further supply lines 10') are behind the pressure sensor 8 in FIG. 3b.

For blowing and stretching the blank in the blown intermediate stage or respectively the intermediate forming stage (for example, in FIG. 12) in a manner known per se, a stretching die generally labelled 11 is used, which is guided axially moveably through the receiving portion 4. Additionally according to the embodiment of the device, in one place an ignition means 12 is arranged for igniting an explosive gas mixture inside the container 1'. Heating and cooling devices, including the cooling means for the stretching die 11 are omitted for simplification and increasing the clarity of the drawings.

In the Figures of the embodiments shown here, many parts of the device, for example also the stretching die 11, extend in a vertical direction from below to above or vice-versa, wherein the construction and functioning of the device are simplified when the container to be manufactured is arranged above, the receiving portion 4 in between, and the stationary tool parts below. In the direction of the longitudinal central axis 13 shown in broken lines in FIG. 4, the stretching die 11 also extends in the vertical with which the longitudinal central axis 13 should be thought of as coinciding. This longitudinal central axis also runs centrally through the receiving portion 4 and the blank 2 or respectively the future intermediately formed container 1' and the completed container 1. When the respective receiving portion 4 is moveable in the direction at right-angles to the longitudinal central axis 13, to transport the blanks 2 or respectively the containers 1, this transport direction is in the horizontal direction according to the arrow 3, while the longitudinal central axis is vertical.

The receiving portion 4 can be brought into engagement by its end facing the container 1 or respectively the blank 2, which is always fitted above, in a flowable medium-tight manner with a distributor module 14. This distributor module 14 is stationary and has a continuous vertical bore 15. At the bottom of this there is located a sealing passage 16 through which the stretching die is moveably guided concentrically and in a sealing manner from the outside into the distributor module and oscillating upwards and downwards. At a small distance above the sealing passage 16 in the inside of the distributor module 14, preferably at a distance of between 2 and 20 mm, there is located a hollow piston 17 which is movably driven relative to the stationary distributor module 14 axially in the bore 15 described, and thus parallel to the longitudinal central axis 13. At a distance from the internal walls of the hollow piston 17, the stretching die 11 moveable with respect to the parts described runs, which can penetrate axially in alignment with the receiving portion into said receiving portion, and also into the blank 2 or respectively the container 1 held by it.

The hollow piston 17 has on its upper, namely its outer, end 18 which faces the receiving portion 4, an annular opposing sealing surface 18 fitting said receiving portion. The hollow receiving portion 4 has on its end (below) facing the container 1 or respectively the blank 2, an annular sealing surface 19. This matches the opposing sealing surface 18 of the hollow piston 17 in such a manner that when the hollow piston 17 moves out of the position shown in FIG. 1 upwards towards the receiving portion 4, the opposing sealing surface 18 goes into the sealing surface 19, and ensures a suitable, flowable medium-tight connection. In other words, by means of the sealing surface 19 at the bottom on the receiving portion 4 and the opposing sealing surface 18 above on the hollow piston 17, the receiving portion 4 can be brought into flowable medium-tight engagement with the distributor module 14. By means of the hollow space formed by the hollow receiving portion 4 and the hollow piston 17, the stretching die 11 is introduced axially such that the longitudinal central axis is common to all the parts of the tool.

Already in FIG. 1, and particularly clearly in FIGS. 4 and 5, a hole 20 is shown in the stretching die 11, which is one of the connectors for flowable media, which are connected via the stationary distributor module 14. In one embodiment, a connector for flowable media is the access 21 to the stretching die 11 which is then configured hollow; or with another embodiment, connectors for flowable media are labelled 9 or 10 on the distributor module. On each connector for flowable media, non-return valves 23 are fitted for closing off and sealing the device-side interior space 22. According to the embodiment, these can have widely differing configurations, as will be explained in part hereinafter. The device-side interior space 22 is the space in the tool and in the blank 2 or respectively the container 1, in which the explosion of the gas mixture takes place.

The actual process with the ignition of the explosive gas mixture, in the embodiment selected here, a gas mixture, is well explained with reference to FIG. 2. Over the time t (in ms) the pressure (in bar) is applied in the device-side interior space 22. The dashed line shows the conventional process. At t=0, a mixture of hydrogen, oxygen and inert gas is blown in through the connectors for flowable media 9, 10, 21 provided for the purpose, as shown approximately in FIGS. 6 and 9, while the stretching die 11 is pushed out of the distributor module 14 through the receiving portion 4 upwards through into the blank such that it is stretched into the intermediate form of the intermediate container 1' shown rounded. Clearly, the blank 2 is previously heated to preferably 120° C. Between the times $t_1$ and $t_2$, the internal pressure is kept in the range of approximately 5–10 bar (stretching pressure), so that the hot blank 2 is stretched and thereby its diameter also increases. Formerly, at time $t_2$ the internal pressure of the non-explosive gases was increased to a good 30 bar, and kept until time $t_5$, whereby the blank 2 or respectively the intermediately formed container 1' was completely pressed against the tool mould, and thereby obtaining the final form of the container 1 to be manufactured, for example, the PET bottle. Ventilation then took place, the mould was meanwhile cooled, and the finished container removed from the form after time $t_7$.

With the new process with the explosive mixture, for example, oxyhydrogen gas, the stretching and blowing takes place by means of the increased internal pressure up until time $t_2$ in the same way. Thereafter, however, the oxyhydrogen gas is ignited, whereby the pressure is briefly increased up to time $t_3$ to over 35 bar, and up to time $t_4$ goes down again to below 20 bar. An inert gas or another gas physically involved with the mixture but not involved in the chemical reaction is introduced at pressure between times $t_4$ and $t_6$ into the interior space 22 and respectively kept there under pressure in order to hold the internal walls of the container 1 just manufactured against the internal wall of the mould, and to ensure cooling and hardening of the plastics material. After time $t_4$ depressurisation takes place and at $t_7$, the container 1 can be removed from the tool.

A first embodiment of the metering unit is described with reference to FIGS. 3a and 3b. The distributor module shown in FIG. 3b on the right is, in the case of the embodiment shown here, supplied with a gas mixture via the supply line 10'a or the supply line 10'b. This can be done via the respective non-return valve 23 and the respective valve labelled 24 via the line 8' or the line 8" from a mixing and pressurising cylinder 25 (FIG. 3a). The latter is driven by the motor M and can mix various gases according to the setting of the valves 24, and supply the further supply line 10' by means of the line 10'a and/or 10'b. With the preferred embodiment taken here, the gas container 26 holds a mixture of argon and oxygen (alternatively with another embodiment, for example, also air). The gas container 27 contains argon. By means of the mixing and pressurising cylinder 25, which can have, for example, a volume of 2 litres, oxygen can be mixed as desired with a more or less large amount of argon, and then supplied to the supply line 8.

In order for oxyhydrogen gas to be an explosive gas mixture, according to FIGS. 3a and 3b oxygen is stored in the gas container 28. This is pre-compressed by means of a pressurising cylinder 29 with a volume of, for example 0.8 litres, to a first pressure of 2.5 bar, and to a stretching pressure of 10 bar. For safety reasons, further non-return valves 23 are connected in front of the connector for flowable media 21 in the stretching die 11.

Alternatively, in order to avoid the storage of large quantities of oxygen, and thereby to further increase the safety of the installation, the oxygen required can, for example also be continuously produced in the respective small amounts required in a parallel manner in an electrolysing unit.

By means of the supply line 9 connected to the metering unit, a flushing gas is introduced through the line 30 in the direction of the arrow 31 shown at the bottom right in FIG. 3b, again by means of a non-return valve 23, into the distributor module 14. This flushing gas is, with this embodiment, compressed air, and acts to force out water and gas residues from the system after the explosion.

In FIG. 3b at the bottom right the zig-zag arrow in the circle is the symbol for high voltage generation 32. The high voltage then leads into the ignition means 12 lying further up, to ignite the explosion.

FIGS. 3c and 3d describe a second other embodiment of a metering unit. The metering unit according to FIGS. 3c and 3d is constructed in a very similar manner to that according to FIGS. 3a and 3b, so like parts have like terms and reference labels. The pressure tank 25a shown in FIG. 3c is different, from which tank only one supply line 8' leads via the valve 24 to the non-return valve 23 and from there as a supply line 10'a to the distributor 14.

The first embodiment according to FIGS. 3a and 3b can be modified to obtain the embodiment according to FIGS. 3c and 3d such that when blank pressing takes place at under 10 bar, the mixing and pressurising cylinder 25 with its supply and drainage lines is replaced by the pressure tank 25a described. In said tank the gases are mixed, for example, the gases coming from the gas containers 26 (argon and oxygen) and 27 (argon) and fed to the pressure tank 25a. From this pressure tank 25a, there is then only one supply line 8' leading to the distributor module 14, as is shown in FIG. 3d. Instead of the mixing and pressurising cylinder 25 of FIG. 3a, in the second embodiment of FIG. 3c, oxygen can be mixed as desired with a more or less large amount of argon in the pressure cylinder 25a, and then supplied to the distributor via the supply line 10'a.

In FIGS. 4 and 5 the upper or respectively the container-side end of the hollow configured stretching die 11. Right at the top there is located a stretching die tip 33 made from plastics, which in other embodiments can also be composed of steel or ceramics. In the present embodiment, plastics is selected so that the tip used for the stretching of the container 1' does not heat up excessively. By means of the continuing and discontinuously operating ignition means 12, the stretching die 11 heats up, which stretching die is, in its substantial portion below the cap-shaped stretching die tip 33, a steel tube 34. The stretching die tip 33 is screwed via the holder 35 to the steel tube 34. At a small distance below the holder 35, holes 20 are located in the steel tube 34, which serve as outlets for flowable media in a hole structure. The flowable medium has to be able to leave the elongated device-side interior space 22 from the hollow stretching die 11, through the holes 20. The device-side interior space 22 is, in the case of this embodiment, an elongated internal channel which extends parallel to the longitudinal central axis 13, from the non-return valve 23 to the height of the holes 20.

The ignition means 12 has, in the illustration according to FIGS. 4 and 5, a spark plug which is also parallel to the longitudinal central axis 13, and terminates upwardly in the area of the holes 20. The non-return valve 23 is connected below. The ignition device 12 is thus arranged above with respect to the non-return valve 23, that is to say on the side facing the holes 20. On the side of the non-return valve 23 opposite the holes 20, a cable 36 is connected which is fed from the non-return valve 23 parallel to the longitudinal central axis 13 downwards, as can be seen clearly in FIG. 5. This cable 36 is electrically connected to a control unit which is not shown, in order to be able to ignite the explosion at any time desired.

The non-return valve 23 in the hollow stretching die 11 is provided with a moveable valve body 37. This valve body 37 can be set up to be flowable medium-tight against a stationary sealing seat 38 fitted internally in the steel tube 34. It is evident from FIGS. 4 and 5 that with ignition of a gas mixture in the device-side interior space 22 (above the internal channel 39 described in the hollow stretching die 11) the over-pressure presses the valve body 37 vertically upwards against the sealing seat 38, and thereby triggers the functioning of the non-return valve 23.

With the embodiments shown here, the valve body 37 can carry turbulence producing means, for example, turbulence producing paddles like the branches of a Christmas tree, or alternatively gas outlets arranged in a spiral shape. In this way the turbulence of the gas mixture when leaving the stretching die 11 can be further improved.

While in FIG. 1, the distributor is shown separated from the receiving portion, so that the receiving portion 4 can be moved perpendicularly to the longitudinal central axis 13, namely in the direction of the arrow 3 (horizontally) from one station (left) to the next (centre or right) relative to the distributor 14, in FIG. 6 the connection of the distributor 14 and respectively its hollow piston 17 with the receiving portion 4 is shown. FIG. 6 shows a specific operating condition. In order to produce this gas-tight connection between the receiving portion 4 and the distributor 14 and respectively its hollow piston 17, the hollow piston 17 is moveable up and down vertically in the direction of the longitudinal central axis. The receiving portion 4 is not moveable in this direction, and the distributor 14 is in any case stationary. If compressed air is fed via the lower pneumatic connector 40 into the cylinder within the continuous vertical bore 15, the hollow piston 17 then moves upwards into the position shown in FIG. 6. (The other way around, compressed air can be fed into the upper pneumatic connector 40 in order to move the hollow piston 17 back down again into the position shown in FIG. 1).

In order to obtain the operating state shown in FIG. 6, a mixture of argon as the inert gas, plus oxygen from the gas container 26 is fed through the supply line 8 into the space around the stretching die 11, and forced into the space still present as a (heated) blank, as the fluid arrows 41 in FIG. 6 show. During this blowing out, the stretching die 11 is also pressed vertically upwards against the base of the blank 2 such that the internal pressure plus the mechanical pressure of the stretching die 11 blow out the softened plastics material of the blank into the intermediate form of the container 1' according to FIG. 6. The supply of oxygen gas helps to support this, which gas is supplied via the connector for flowable media 21 below in the stretching die 11, and is forced through the internal channel 39 (shown in FIGS. 4 and 5) upwards to the holes 20, where the oxygen flows according to the oxygen arrows 42 into the volume of the intermediate container 1'. The material of the blank 2 lies, in the form of the intermediate container 1', more or less on the internal surface, which is not shown, of the moulding tool, wherein with the aid of the gases (41, 42) and of the stretching die 11, blowing and stretching takes place.

Naturally, it is also possible to force the mixture of inert gas and oxygen in the direction of the further arrow 43 (gas mixture inlet) through the supply line 9 into the distributor module 14, so that it enters in the manner of the fluid arrows 41 in the same way as described hereinabove into the volume to be blown out. This constituted the pre-stretching and forming.

The next operating state can be well explained with reference to FIG. 7. Here, forming takes place by means of explosion. Behind the holes 20 in the hollow stretching die 11, there is located the ignition means 12 which obtains the signal for ignition by means of its cable 36, when the pre-stretching and forming is finished and the intermediate shape of the container 1' is obtained. By means of the ignition which is indicated in FIG. 7 at the top by the asymmetrical star 44 (ignition), water is formed from the gas mixture of oxygen and hydrogen by means of the oxyhydrogen gas explosion, according to the formula $2H_2+O=2H_2O$. According to FIG. 2, in time $t_2$ to time $t_3$ a very high pressure of over 35 bar is briefly created. This gas pressure ensures the contact of the still warm plastics walls on the internal surface of the mould, so the shape of the finished container 1 occurs, as is shown in FIG. 7. In this state, the stretching die 11 is located in its position pushed out upwardly. In this position, the holes 20 with the ignition means 12 located behind them, lie clearly in the centre in the volume of the container 1 to be formed. Not only does the pressure ensure good forming of the container 1, but also a brief increase in temperature occurs so that the interior space of the container 1 is sterilised at the same time.

In order that the configurations and dimensions can be better evaluated, the same illustrations in FIG. 8 are shown in perspective and partly cut away. In order that water occurring in the device-side interior space 22 die to the oxyhydrogen gas explosion can be ventilated and removed, the line 10 leading outwards diagonally downwards is provided, which line leads to the outlet 45 according to the arrow in FIG. 3b. Additionally, the flushing gas from the line 30 via the supply line 9 for driving out water and other gas residues can act in a supporting manner.

It is obvious that to obtain lower operating costs it is advantageous not to simply blow off the argon not involved in the chemical reaction after forming of the container, but rather to clean and dry it in a recovery installation and use it again.

It can be imagined from FIG. 8 that the hollow piston 17 is moved in the direction of the longitudinal central axis 13 vertically downwards after ventilation, so that the annular sealing surface 19 on the receiving portion below the opposing sealing surface 18 on the external end of the hollow piston 17 is lifted up such that the state according to FIG. 1 is obtained again. Now, with the aid of the horizontal feed mechanism, which is not shown, the receiving portion 4 is moved with the newly formed container 1 in the direction of the arrow 3 horizontally out of the central position into the position shown in FIG. 8 at the top right rear. At the same time the receiving portion 4 shown at the left front is brought with the blank 2 into the central position, so that the state shown in FIG. 1 is obtained again.

Another embodiment is shown in FIG. 9. Here, the stretching die 11 is not configured hollow, but instead solid. On its upper, external, free end, it is provided with a ball 46. For pre-stretching and forming in FIG. 9, inert gas, oxygen and in this case also hydrogen is blown in a similar manner to FIG. 6, from below from the open end 7 of the container 1' around the stretching die 11 within the hollow piston 17 and the receiving portion 4, vertically upwards from a supply line here labelled 10, and in accordance with the fluid arrows 41 into the hot blank 2 such that with the aid of the stretching die 11 with its ball 46 (located on the tip), the intermediate form of the container 1' is formed.

In the embodiment of FIG. 9, the non-return valves 23 are active in closing off the entire device-side interior space as far as inside the distributor module 14 from the outside. Then, the ignition means 12 fitted in the distributor module 14 in the case of this embodiment, which for example could be arranged in the place of the supply line labelled 8, can explode the oxyhydrogen gas mixture in the whole device-side interior space 22, from the distributor module 14 at the bottom to above in the space of the container 1' still in its intermediate form. The pre-stretching and forming is also shown in FIG. 9.

Another, similar embodiment is shown in FIG. 10, which is constructed in a manner similar to FIG. 9, wherein, however, the ignition means 12 is arranged above and in the area of the opposing sealing surface 18 of the external end of the hollow piston 17. The explosion symbolised by the ignition star 44 is triggered when the stretching die 11 is located in its lower, withdrawn position. The external sealing surface of the ball 46 is then engaged with a sealing seat 47 in the hollow piston. The device-side interior space 22 is located in the case of this embodiment practically only in the area of the receiving portion 4, and the ball 46 with the sealing seat 47 in the hollow piston 17 acts as a non-return valve 23.

In FIG. 9, although the sealing seat 47 in the hollow piston 17 is also shown at the top, in the case of FIG. 9, the ignition means must then be removed from the area of the distributor module 14 and taken upwards into the area of the receiving portion 4.

Another further embodiment is shown in FIG. 11. Again, the hollow piston 17 is provided on its end facing the receiving portion 4 with a sealing seat 48, which has a similar function to the sealing seat 47 in the hollow piston 17 in the embodiment according to FIGS. 9 and 10. In FIGS. 9 and 10 this annular sealing seat 47, which tapers vertically upwards in the manner of a truncated cone, engages with the radially widened portion, that is to say the ball 46, which can also be configured as a cone, ring or the like. The ball 46 was fitted wholly on the free upper end of the stretching die 11 in accordance with FIGS. 9 and 10.

In the embodiment of FIG. 11, on the other hand, the annular sealing seat 48 in the hollow piston 17, which tapers vertically upwards in the manner of a truncated cone, engages with a shoulder 49 on the solidly configured stretching die 11. This shoulder 49 is located far below the free upper end of the stretching die. The distance from the upper free end of the stretching die 11 is approximately the same as the length of the container 1 to be manufactured plus the length of the receiving portion 4, both measured in the direction of the longitudinal central axis 13. The stretching die 11 thus engages by means of its shoulder 49 with the annular sealing seat 48 in the hollow piston 17 according to FIG. 11, when the thinner part of the stretching die 11 is pushed up above the shoulder 49 completely up into the container 1 to be manufactured. The shoulder 49 can then lie on the sealing seat 48 and closes off the device-side interior space 22 which constitutes the volume in the receiving portion 4 plus the volume in the container 1 to be manufactured from the outside. The annular space in the hollow cylinder 17 and in the distributor module 14 outside the lower, thicker part of the stretching die 11 with the larger diameter is not subjected to the high pressure and the high temperature when the oxyhydrogen gas is ignited. The advantage of the embodiment of FIG. 11 compared to that of FIG. 10 is in that the ignition by an ignition means not shown in FIG. 11, which is arranged, for example, in the area of the receiving portion, can trigger the explosion while the stretching die 11 is still conducted into its pushed forward "stretching position". The time taken for withdrawing the stretching die 11 vertically downwards is thus saved.

In the two embodiments according to FIGS. 9 and 10 on the one hand and also according to FIG. 11 on the other hand, the stretching die 11 is solid, that is to say is not configured hollow. In both embodiments the device-side interior space 22 can be closed off from the outside by means of the radially widened portion (ball 46 or shoulder 49), without a non-return valve having to be arranged in addition.

The further advantage of the embodiment according to FIGS. 9 and 10 is in that the diameter of the stretching die 11 compared to the stretching die with the hollow configuration can be very small, with the result that a larger free cross-section in the form of the annular space around the stretching die 11 is available for the blowing in of fluid (gas mixtures). In this way time is gained, as the device-side interior space 22 can be filled more rapidly with the desired fluid. It is also advantageous that the stretching die 11 in the embodiment according to FIGS. 9 and 10 is no so hot as only a smaller part thereof is located in the explosion area.

FIG. 12 clearly shows the external thread of the open end 7 of the container 1' which can later be closed after filling by means of a cap. It is often desired to keep the cap, and in particular its internal area, including the thread, sterile. It is then advantageous when the external thread on the open end 7 of the container 1' is sterilised. This sterilising is done by brief heating during the explosion of the oxyhydrogen gas, wherein sterilising hot gas also acts in the service space 5 within the centring 6 upon the external thread on the open end 7 of the container 1'. With suitable size and construction of the service space, it is thus also possible to sterilise the closure later used to close the container in the same operating process.

List of Designations

1 container
1' partly formed container or respectively intermediate blank
2 blank
3 arrow
4 receiving portion
5 service space
6 centring
7 open end of the container
8 pressure sensor
8', 8" supply line
9 supply line
10, 10' 10a, 10'b supply lines
11 stretching die
12 ignition means 13 longitudinal central axis
14 distributor module
15 continuous vertical bore
16 sealing passage
17 hollow piston
18 opposing sealing surface
19 annular sealing surface
20 hole
21 connector for flowable media
22 device-side interior space
23 non-return valve
24 valve
25 mixing and pressurising cylinder
26 gas container
27 gas container (argon)
28 gas container (hydrogen)
29 pressure cylinder
30 flushing gas line
31 arrow
32 high voltage generation
33 stretching die tip
34 steel tube
35 holder
36 cable
37 moveable valve body
38 sealing seat
39 internal channel
40 pneumatic connector
41 fluid arrow
42 $H_2$ arrow
43 arrow (gas mixture inlet)
44 star (ignition)
45 outlet
46 ball
47 sealing seat in the hollow piston
48 sealing seat in the hollow piston
49 shoulder

What is claimed is:

1. Device for manufacturing container (1, 1') from a plastics material which can be formed by stretch-blowing with a mould, the internal space of which corresponds to the finished container (1), which is held by its open end (7) by a receiving portion (4), wherein lines (9, 10) connected to a metering unit are provided on the receiving portion (4), a moveable stretching die (11) is guided axially through the receiving portion (4) and an ignition means (12) is arranged in order to ignite an explosive gas mixture inside the container (1'), and wherein heating and cooling means are provided, characterised in that the receiving portion (4), at its end opposite the container (1) can be engaged in a flowable medium-tight manner with a distributor module (14), through which the stretching die (11) is moveably passed axially extending the receiving portion (4), and on which at least one connector for flowable media (9, 10, 21) is fitted, in that the at least one connector for flowable media (9, 10, 21) can be closed off in order to seal the device-side interior space (22), and in that the ignition means (12) is fitted in the device-side interior space (22).

2. A device for forming a deformable plastic material blank (2), having an open end (7), into a mold having an internal space shaped to correspond to a desired shape of a container (1); said device comprising:

a receiving portion (4) for holding and sealing to said open end (7), said receiving portion having a receiving portion axial channel for accommodating a movable stretching die (11);

a distributor module (14) having a module axial channel for accommodating a movable stretching die (11), said distributor module (14) engaging the receiving portion (4) in a fluid tight seal so that the receiving portion axial channel and module axial channel are axially aligned and so that the distributor module and receiving portion together have a device-side interior space (22), said distributor module further having at least one connector for at least one fluid line to connect the fluid line to the device-side interior space;

a movable stretching die (11) arranged to be guided axially through the receiving portion axial channel and the module axial channel;

a metering unit;

at least one tubular line connected between the metering unit and said at least one connector of the distributor module, said tubular line being closable to seal the device-side interior space;

a heating means for heating the blank (2) to render it readily deformable;

an ignitor (12) positioned within the device-side interior space for igniting an explosive gas mixture within the blank (2); and a cooling means for cooling the finished container.

3. A device according to claim 2 wherein the receiving portion (4) has, at an end opposite the container (1), an annular sealing surface (19) through which the stretching die (11) is movably passed, axially extending the receiving portion (4).

4. A device according to claim 2 wherein the closing means for sealing off the device-side interior space (22) is a check valve (23).

5. A device according to claim 2 wherein the stretching die (11) is hollow and has at least one outlet aperture (20) arranged on a stretching die tip, at least one fluid inlet (21) and at least one internal channel (39) connecting aperture (20) and inlet (21).

6. A device for forming a deformable plastic material blank (2), having an open end (7), into a mold having an internal space shaped to correspond to a desired shape of a container (1); said device comprising:

a receiving portion (4) for holding and sealing to said open end (7), said receiving portion having a receiving portion axial channel for accommodating a movable stretching die (11);

a distributor module (14) having a module axial channel for accommodating a movable stretching die (11), said distributor module (14) engaging the receiving portion (4) in a fluid tight seal so that the receiving portion axial channel and module axial channel are axially aligned and so that the distributor module and receiving portion together have a device-side interior space (22), said distributor module further having at least one connector for at least one fluid line to connect the fluid line to the device-side interior space;

a movable stretching die (11) arranged to be guided axially through the receiving portion axial channel and the module axial channel;

a metering unit;

at least one tubular line connected between the metering unit and said at least one connector of the distributor module, said tubular line being closable to seal the device-side interior space;

a heating means for heating the blank (2) to render it readily deformable;

an ignitor (12) positioned within the device-side interior space for igniting an explosive gas mixture within the blank (2); and a cooling means for cooling the finished container, wherein the stretching die (11) is hollow and has at least one outlet aperture (20) arranged on a stretching die tip, at least one fluid inlet (21) and at least one internal channel (39) connecting aperture (20) and inlet (21); and wherein a check valve (23) is located within stretching die (11) proximate outlet aperture (20).

7. A device according to claim 6 wherein the ignitor (12) is fitted in the hollow stretching die (11) between check valve (230 and outlet aperture (20) and is oriented to stop flow from the aperture (20) to inlet (21) and the ignitor is electrically connected by means of a cable (36) running in the hollow stretching die (11) to a control unit.

8. A device according to claim 2 wherein the stretching die (11) is a steel tube (34) with a cap-shaped stretching die tip on which the fluid outlet (20) is fitted in a hole and the check valve (23) is provided with a valve body (37) movable with respect to a sealing seat (38) fitted inside the steel tube (34).

9. A device according to claim 2 wherein a means is provided for moving receiving portion (4) perpendicular to its longitudinal axis (13).

10. A device according to claim 2 wherein the receiving portion (4) is widened at an end opposite distributor module (14) to form a service space (5) in which a centering ring (6) is fitted.

11. A device according to claim 2 wherein an axially movable hollow piston (17) is arranged in the distributor module (14), said piston being provided with an annular opposing sealing surface (18) fitting a sealing surface (19) of the receiving portion (4).

12. A device according to claim 11 wherein a seal (16) is fitted into a base of the distributor module (14) around the piston ((17).

13. A device according to claim 2 wherein at least one supply line and at least one drainage line, connected to the metering unit, are connected to the distributor module (14).

14. A device according to claim 2 wherein each of the supply lines and drainage lines are connected to the distributor module (14) are connected to a check valve (23), and the ignition means (12) is fitted in the distributor module (14).

15. A device for forming a deformable plastic material blank (2), having an open end (7), into a mold having an internal space shaped to correspond to a desired shape of a container (1); said device comprising:

a receiving portion (4) for holding and sealing to said open end (7), said receiving portion having a receiving portion axial channel for accommodating a movable stretching die (11);

a distributor module (14) having a module axial channel for accommodating a movable stretching die (11), said distributor module (14) engaging the receiving portion (4) in a fluid tight seal so that the receiving portion axial channel and module axial channel are axially aligned and so that the distributor module and receiving portion together have a device-side interior space (22), said distributor module further having at least one connector for at least one fluid line to connect the fluid line to the device-side interior space;

a movable stretching die (11) arranged to be guided axially through the receiving portion axial channel and the module axial channel;

a metering unit;

at least one tubular line connected between the metering unit and said at least one connector of the distributor module, said tubular line being closable to seal the device-side interior space;

a heating means for heating the blank (2) to render it readily deformable;

an ignitor (12) positioned within the device-side interior space for igniting an explosive gas mixture within the blank (2); and a cooling means for cooling the finished container wherein a hollow piston (17) is provided with an annular seat (47, 48) on an end facing the receiving portion (4), and the stretching die (11) carries a radially widened portion (46) perpendicular to its longitudinal axis (13) on an end movable into the container to be manufactured for engagement with the sealing seat.

* * * * *